C. M. RUMBAUGH & M. C. JONES.
STALK CUTTER.
APPLICATION FILED MAY 26, 1915.
1,160,328.  Patented Nov. 16, 1915.
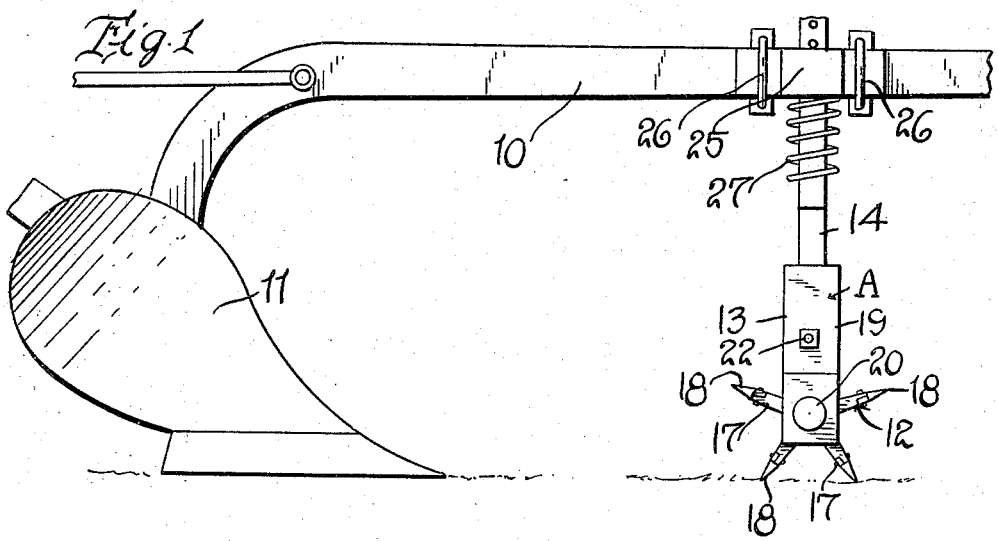
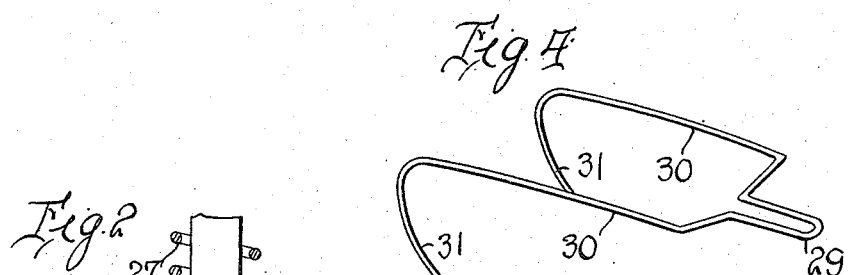
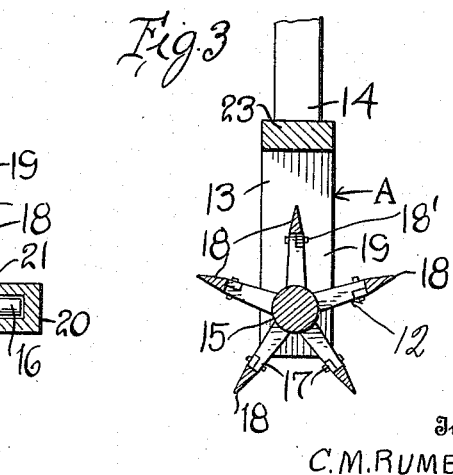
Inventors
C. M. RUMBAUGH
& M. C. JONES
By Watson E. Coleman
Attorney

UNITED STATES PATENT OFFICE.

CHARLIE MARVIN RUMBAUGH AND MELVIN COMMODORE JONES, OF LOHN, TEXAS.

STALK-CUTTER.

1,160,328.  Specification of Letters Patent.  Patented Nov. 16, 1915.

Application filed May 26, 1915. Serial No. 30,620.

*To all whom it may concern:*

Be it known that we, CHARLIE M. RUMBAUGH and MELVIN C. JONES, citizens of the United States, residing at Lohn, in the county of McCulloch and State of Texas, have invented certain new and useful Improvements in Stalk-Cutters, of which the following is a specification, reference being had to the accompanying drawings.

Our present invention relates to new and useful improvements in agricultural implements and has more particular reference to the provision of an improved stalk cutter which may be employed in connection with a plow.

The principal object of the invention is to provide a stalk cutter which may be readily attached to any standard form of plow, without requiring any changes or alterations in the construction thereof.

A more specific object of the invention is to provide a stalk cutter which consists essentially in a rotatable cutting wheel equipped with an attaching standard by which it may be connected to the frame of the plow for vertical sliding movement with respect thereto.

The above, and other incidental objects of a similar nature, which will be hereinafter more specifically treated are accomplished by such means as are illustrated in the accompanying drawings, described in the following specification, and then more particularly pointed out in the claims which are appended hereto and form part of this application.

With reference to the drawings, wherein there has been illustrated the preferred embodiment of this invention, as it is reduced to practice, and throughout the several views of which similar reference numerals designate corresponding parts, Figure 1 is a side elevation; Fig. 2 is a detail face view of the cutter wheel and its supporting yoke removed from the plow, the lower terminals of the arms of the yoke being shown in section; Fig. 3 is a section on the line 3—3, of Fig. 2; and Fig. 4 is a detail perspective view of the rake member.

As best disclosed in Fig. 1, the stalk cutter designated as an entirety by the letter A, is designed for attachment to the beam 10 of a conventional plow 11. The stalk cutter broadly comprises a cutting wheel 12, a supporting yoke 13, in which the wheel is journaled, and a standard 14, which carries the supporting yoke and is slidably connected to the beam.

The cutter wheel, as illustrated in detail in Fig. 2, includes a hub or axle 15, from the terminals of which extend the spindles 16 and from the body of which extend a plurality of radially disposed circumferentially spaced spokes 17 which are arranged in longitudinally alined pairs. A cutter knife or bar 18 is secured to the outer terminal of each pair of spokes, by bolts 18' or any equivalent fastening devices.

The spindles 16 are journaled in openings formed in the vertical arms or bars 19 of the supporting yoke 13 and extend therethrough, being closed at their outer terminals by caps 20, the inner ends of which are let into receiving recesses 21 formed in the outer faces of the arms 19. One arm of the yoke is formed in two detachable sections which, as shown in Fig. 2 are adapted to be connected by a bolt 22. The purpose of this particular construction of one arm is to permit the cutter wheel to be easily and quickly inserted in the yoke or removed therefrom.

The standard 14 may be formed as an integral part of the yoke or may be separately formed and secured thereto by means of bolts or equivalent fastening devices. The standard rises vertically from one side of the center of the horizontal bight bar 23 of the yoke and is transversely offset at an intermediate point, forming the shoulder 24. The upper portion of the standard is mounted for sliding movement through an attaching bracket or plate 25, which member is clamped by U bolts 26 or similar fastening devices to the side face of the plow beam.

From the foregoing description, it will now be seen that the cutter wheel is capable of vertical adjustment when passing over uneven ground and that the upward movement of the standard through the attaching bracket is limited by the shoulder 24. As a means for yieldably maintaining the cutter bar in engagement with the ground so that it will properly engage with the stalks to be cut, even though the ground be unduly rough and broken, there is provided a helical spring 27 which is of the expansive type and is wound about the upper portion of the standard. The upper end of the spring bears against the attaching plate and the lower end bears against the shoulder 24. Since the spring is of the expansive type, it obviously acts to yieldably dispose the cutter wheel into engagement with the ground at all times.

The foregoing description and the accompanying drawings make it apparent that the stalk cutter is really in the nature of an attachment which may be applied to or removed from any standard form of plow, without requiring any changes in the construction thereof.

Regarding the operation of the cutter wheel, it will be readily apparent that this member will be rotated within the supporting yoke and that the cutting blades or bars 18 will be successively brought into engagement with the stalks to be cut, upon the movement of the plow in the usual manner.

In order that the plow may be turned at the end of the furrow, without requiring that the wheel be also turned, we interpose in the standard immediately above the shoulder 24, a swivel joint 28.

As a means for drawing the stalks together in front of the cutter, we employ a rake which consists preferably in a single rod of metal which is, as shown in detail in Fig. 4, bent to form a U-shaped attaching loop 29 and is then bent to produce the parallel, rearwardly extending arms 30 which are bent downwardly at their rear ends to produce the curved hooks or teeth 31. The loop 29 is designed for attachment to the plow beam.

In reduction to practice, it has been found that the form of this invention illustrated in the drawings, and referred to in the above description as the preferred embodiment, is the most efficient and practical; yet realizing that the conditions concurrent with the adoption of this device will necessarily vary, it is desirable to emphasize the fact that various minor changes in the details of construction, proportion and arrangement of parts may be resorted to, when required, without sacrificing any of the advantages of this invention, as defined by the appended claims.

What is claimed is:—

1. A stalk cutter including a draft beam, a substantially U-shaped supporting yoke, one arm of said yoke having a detachable section, a wheel journaled between the second arm of the yoke and the detachable section of the first named arm, said wheel including a hub, a plurality of radially extending spokes, and a plurality of circumferentially spaced, parallel cutter blades carried terminally of the spokes, a standard slidably connecting the supporting yoke to the beam, and means coacting with the standard and the beam for normally depressing the wheel in engagement with the ground.

2. The combination with a plow beam and a plow, of a stalk cutter including a supporting yoke, a cutter wheel journaled in the yoke, a standard rising from the yoke, said standard being formed in two sections connected by a swivel joint, the upper section being slidably connected to the beam for vertical movement with respect thereto, the lower section of the standard adjacent the swivel joint being provided with a shoulder, and an expansible member surrounding the upper section of the standard and interposed between the beam and the shoulder for normally depressing the cutter wheel into engagement with the ground.

In testimony whereof we hereunto affix our signatures in the presence of two witnesses.

CHARLIE MARVIN RUMBAUGH,
MELVIN COMMODORE JONES.

Witnesses:
A. L. MILBURN,
J. R. MULLINS.

Copies of this patent may be obtained for five cents each, by addressing the "Commissioner of Patents, Washington, D. C."